(12) United States Patent
Storz et al.

(10) Patent No.: US 7,463,414 B2
(45) Date of Patent: Dec. 9, 2008

(54) MICROSCOPE

(75) Inventors: Rafael Storz, Heidelberg (DE); Heinrich Ulrich, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/340,965

(22) Filed: Jan. 26, 2006

(65) Prior Publication Data

US 2006/0164723 A1 Jul. 27, 2006

Related U.S. Application Data

(60) Provisional application No. 60/751,515, filed on Dec. 19, 2005.

(30) Foreign Application Priority Data

Jan. 26, 2005 (DE) .................. 10 2005 003797

(51) Int. Cl.
*G02B 21/26* (2006.01)

(52) U.S. Cl. .................. 359/379; 359/382; 359/383

(58) Field of Classification Search ................ 359/383, 359/379, 382

See application file for complete search history.

(56) References Cited

U.S. PATENT DOCUMENTS

| | | | | |
|---|---|---|---|---|
| 3,401,999 | A * | 9/1968 | Kephart et al. | 359/384 |
| 6,661,573 | B1 * | 12/2003 | Davis | 359/381 |
| 2001/0021064 | A1 | 9/2001 | Toyoda et al. | |
| 2003/0157725 | A1 | 8/2003 | Franzen et al. | |
| 2004/0113043 | A1 * | 6/2004 | Ishikawa et al. | 250/201.4 |
| 2006/0012871 | A1 * | 1/2006 | Funk et al. | 359/385 |
| 2006/0139747 | A1 * | 6/2006 | Dietzsch et al. | 359/368 |

FOREIGN PATENT DOCUMENTS

DE 102 61 663 1/2004

* cited by examiner

*Primary Examiner*—Joshua L Pritchett
(74) *Attorney, Agent, or Firm*—Darby & Darby

(57) ABSTRACT

A microscope includes an adjustment device for positioning a specimen stage. An objective, an objective changer and/or an objective turret is coupled to the adjustment device so that a position of the objective element is adjustable by the adjustment device. A holder for the objective element may be provided coupling the objective element to the adjustment device.

18 Claims, 3 Drawing Sheets

MICROSCOPE

Priority is claimed to the provisional application 60/751,515 entitled "Microscope," filed by applicants on Dec. 19, 2005, and to German patent application DE 10 2005 003 797.6, filed on Jan. 26, 2005, the entire subject matters of both of which are hereby incorporated by reference herein.

The present invention relates to a microscope with an objective and/or an objective changer and/or an objective turret as well as adjustment means for positioning a specimen stage.

BACKGROUND

Microscopes with an objective and/or an objective changer and/or an objective turret as well as adjustment means for positioning a specimen stage are known from actual practice and exist in various versions. For instance, microscopes are known in which the objective, an objective changer or an objective turret are adjusted by means of a special drive mounted on the stand of the microscope. In addition, the prior-art microscopes are provided with an adjustment means for positioning a specimen stage.

Therefore, the prior-art microscopes entail the drawback that the stand of the microscope has to be specially designed to receive a holding device with a drive for the objective, the objective changer or the objective turret. This often translates into a limited path of travel in the Z-direction, that is to say, in the direction of travel of the objective along its optical axis.

SUMMARY OF THE INVENTION

Thus, it is an object of the present invention to provide a microscope with an objective and/or an objective changer and/or an objective turret as well as adjustment means for positioning a specimen stage, having a simple structure.

The present invention provides a microscope with an objective and/or an objective changer and/or an objective turret as well as an adjustment means for positioning a specimen stage. The objective and/or the objective changer and/or the objective turret is/are coupled to the adjustment means in such a way that the position of the objective and/or the objective changer and/or the objective turret can be adjusted by the adjustment means.

It has been recognized according to the invention that it is not absolutely necessary to provide a separate adjustment or regulation means to move the objective, the objective changer or the objective turret on a microscope. It has also been recognized according to the invention that the coupling of the objective and/or the objective changer and/or the objective turret to the adjustment means achieves the object outlined above in a surprisingly simple manner. The coupling is done in such a way that the position of the objective and/or of the objective changer and/or of the objective turret can be adjusted by the adjustment means. In other words, the adjustment means provided for the specimen stage can be used to adjust the objective and/or the objective changer and/or the objective turret. There is no need for a special holding device that is arranged in the stand and that has a drive for the objective and/or the objective changer and/or the objective turret. This greatly simplifies the structure of the stand and thus of the microscope.

For example, a standard stand of an upright microscope can be used for the microscope according to the invention. Here, the path of travel in the Z-direction can be considerably longer.

Consequently, the microscope according to the invention constitutes a microscope in which a particularly simple structure can be realized.

When it comes to achieving a particularly simple construction, the objective and/or the objective changer and/or the objective turret could be coupled by means of a holder for the objective and/or the objective changer and/or the objective turret that can be coupled to the adjustment means. Here, such a holder could function as an adapter between the adjustment means and the objective and/or the objective changer and/or the objective turret.

With an eye towards attaining particularly high flexibility, the holder could be reversibly coupled to and uncoupled from the adjustment means. The holder could be removed from and once again mounted on the adjustment means as needed. Here, different holders could be employed for different objectives, objective changers and/or objective turrets. In any case, the activation of the adjustment means facilitates movement in the Z-direction.

Furthermore, in order to attain high flexibility for the microscope, the specimen stage could be reversibly coupled to and uncoupled from the adjustment means. This allows work to be done with the microscope as desired, with or without a specimen stage.

In an advantageous embodiment of the microscope, as an alternative or in addition to the specimen stage, the holder could be coupled to the adjustment means. In the case of an embodiment of the microscope without a holder, likewise as an alternative or in addition to the specimen stage, the objective and/or the objective changer and/or the objective turret could be coupled to the adjustment means. A suitable configuration is to be selected here as a function of the requirements.

Various options exist for the coupling of the objective and/or the objective changer and/or the objective turret to the adjustment means. In a simple embodiment, the coupling could be done by means of a screwed connection. As an alternative to this and with an eye towards achieving a particularly fast coupling and uncoupling procedure, a catch, preferably a bayonet connection, can be employed. However, clamping, latching or snap-on connections are likewise possible in order to ensure a reliable coupling.

In an advantageous embodiment, the holder or the adjustment means could be configured so as to receive a macro-objective. As a result, in an advantageous manner, a microscope could be configured with a scanner connection by means of which large specimens can be viewed and which concurrently has a good fluorescence axis.

Fundamentally, different holders can be received and/or coupled as well as driven. Here, for example, a single special large-size objective or, optionally, an objective changer for two objectives or an objective turret with standard objectives could be used.

In the case of the microscope according to the invention, it is advantageous for an already present adjustment means for positioning a specimen stage to be used to move an objective and/or an objective changer and/or an objective turret. Another special adjustment means for an objective and/or an objective changer and/or an objective turret is not necessary here.

The adjustment means could have a mechanical or electric drive. This should be chosen as a function of the application case in question.

In the embodiment of the microscope according to the invention, the adjustment means for positioning the specimen stage can be used to generate a relative movement of the objective and/or the objective changer and/or the objective turret with respect to the stand or the base of the microscope. In an advantageous embodiment of the microscope, a relative movement between the specimen stage and the objective and/or the objective changer and/or the objective turret could be provided. For this purpose, the adjustment means can be configured in an appropriate manner so that the objective and/or the objective changer and/or the objective turret can be moved independently of the specimen stage and the specimen stage can be moved independently of the objective and/or the objective changer and/or the objective turret. Here, the mobility of the specimen stage relative to the stand can be retained in any case.

The present invention is particularly suitable for use with so-called fixed-stage microscopes where the function of the focusing drive of the objective is carried out by the drive of the objective stage rather than through a mechanism in the stand.

BRIEF DESCRIPTION OF THE DRAWINGS

Several possibilities exist to configure and refine the teaching of the present invention in an advantageous manner. In conjunction with the explanation below of an exemplary embodiment of the invention, making reference to the drawings, a general explanation is also provided of refinements of the teaching. The drawings show the following.

DETAILED DESCRIPTION

Figure 1:
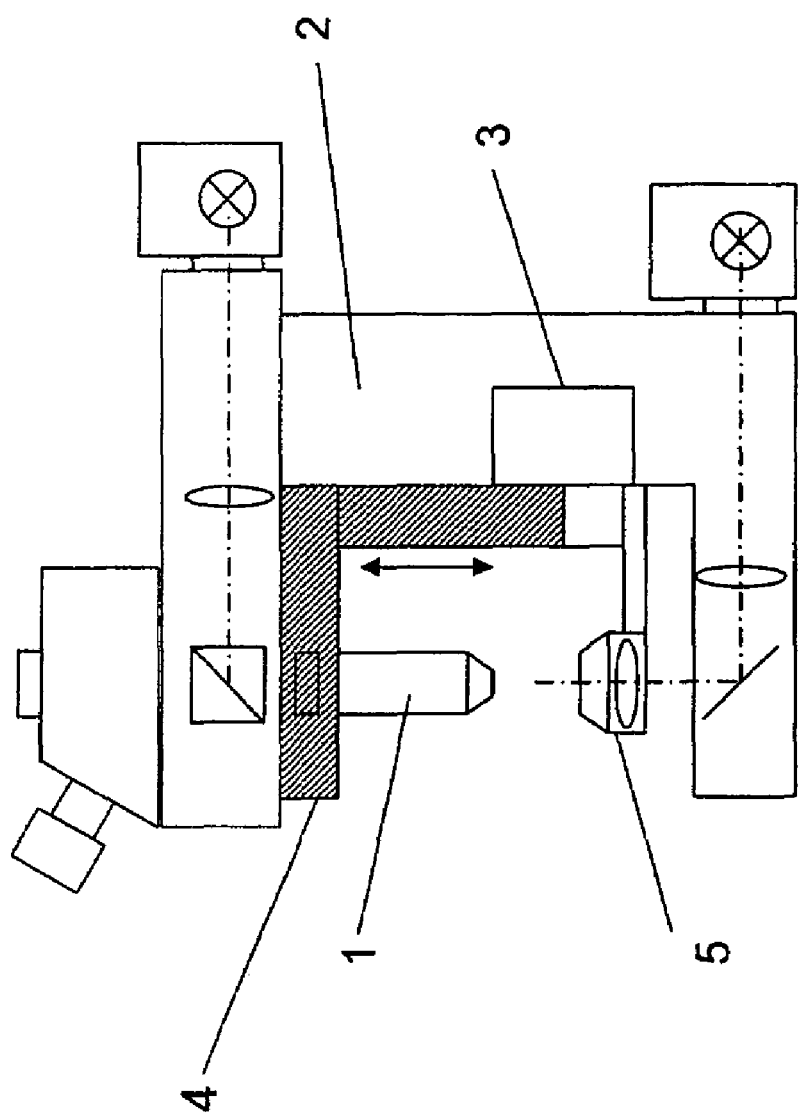
FIG. 1—a schematic depiction of as embodiment of a microscope according to the invention.

FIG. 1 schematically shows an embodiment of a microscope according to the invention. The microscope has an objective 1 and an adjustment means 3 for positioning a specimen stage arranged in the stand 2 of the microscope. With an eye towards achieving a particularly simple structure, the objective 1 can be coupled to the adjustment means 3 in such a way that the position of the objective 1 can be adjusted by the adjustment means 3. In order to make it easy to couple the objective 1 to the adjustment means 3, a holder 4 that can be coupled to the adjustment means 3 is provided for the objective 1.

The holder 4 can be reversibly coupled to and uncoupled from the adjustment means 3.

Furthermore, the reference numeral 5 designates a condensor of the microscope.

The coupling of the objective 1 and/or the holder 4 can be done as desired by means of a screwed connection, a catch, preferably a bayonet connection, or else by means of a clamping, latching or snap-on connection.

Figure 2:
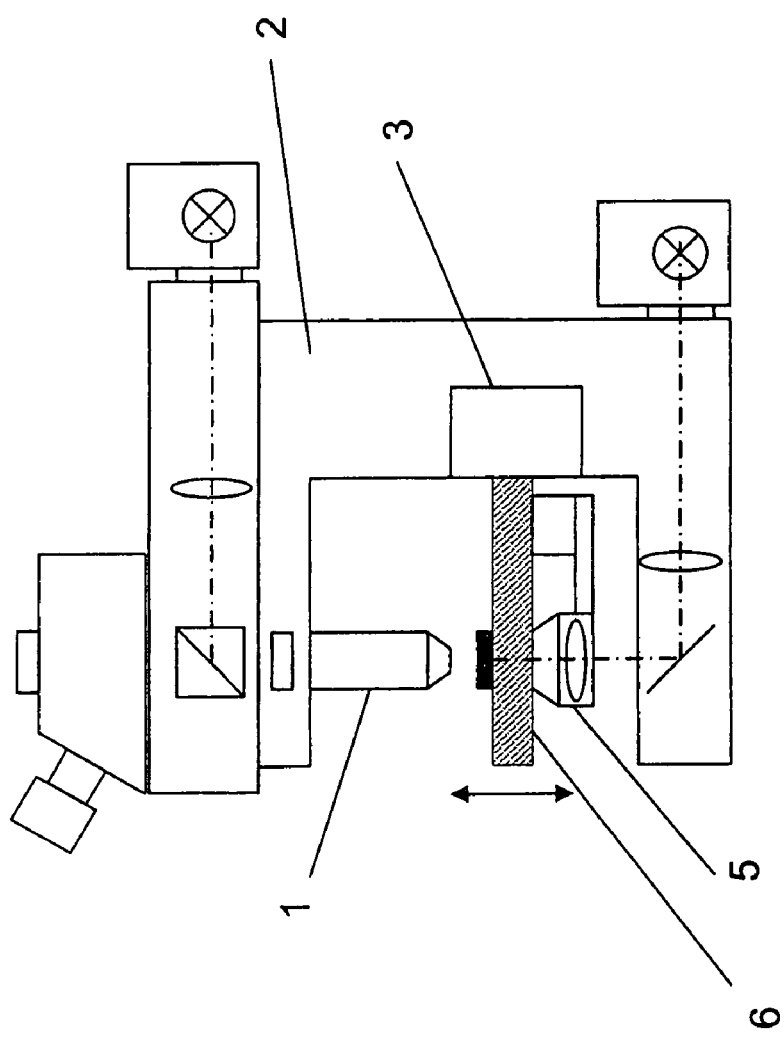
FIG. 2—a schematic depiction of a conventional microscope.

FIG. 2 schematically shows a conventional microscope having an objective 1, a stand 2, an adjustment means 3 for a specimen stage 6 and a condensor 5. Aside from the adjustment means 3 for the specimen stage 6, another adjustment means (not shown here) for the objective 1 is provided, which is additionally integrated into the stand 2 of the microscope 1. This renders the conventional microscope more complex in comparison to the microscope according to the invention.

Figure 3:
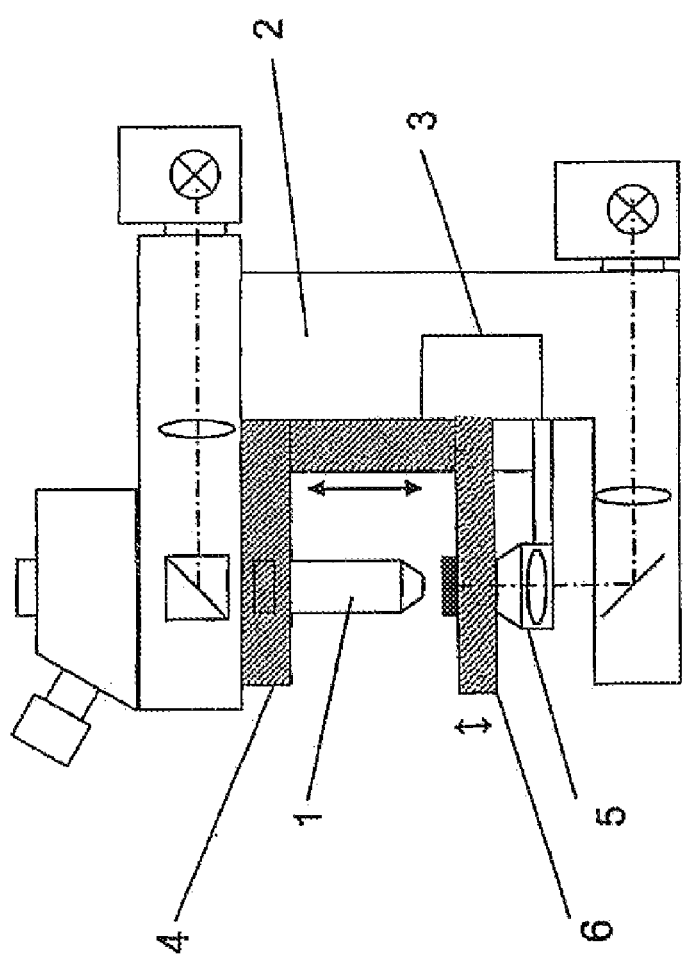
FIG. 3—a schematic depiction of an embodiment of a microscope according to the invention.

FIG. 3 schematically shows an embodiment a microscope according to the invention. The microscope has an objective 1 and an adjustment means 3 for positioning a specimen stage 6 arranged in the stand 2 of the microscope. The objective 1 can be coupled to the adjustment means 3 in such a way that the position of the objective 1 can be adjusted by the adjustment means 3. Further, the position of the objective 1 can be adjusted by the adjustment means 3 independently of the position of the specimen stage 6. Likewise, the position of the specimen stage 6 can be adjusted independently of the position of the objective 1 using the same adjustment means 3.

Regarding other advantageous embodiments of the teaching according to the invention, in order to avoid repetitions, reference is hereby made to the general part of the description as well as to the accompanying patent claims.

Finally, it should be pointed out explicitly that the embodiment described above merely serves for purposes of elucidating the teaching being claimed but that the latter should not be construed as being restricted to this embodiment.

What is claimed is:

1. A microscope comprising:
   an adjustment device including one of a mechanical and an electrical drive
   at least one of a stand and a base;
   a specimen stage coupled to the adjustment device; and
   an objective element including at least one of an objective, an objective changer and an objective turret, the objective element being coupled to the adjustment device,
   wherein the adjustment device is operable to move the specimen stage using the one of a mechanical drive and an electrical drive, and
   wherein the adjustment device is operable to move the objective element relative to the at least one of a stand and a base along an optical axis of the objective element using the one of a mechanical drive and an electrical drive.

2. The microscope as recited in claim 1 further comprising a holder for the objective element configured to couple the objective element to the adjustment device.

3. The microscope as recited in claim 2 wherein the holder is configured to be reversibly coupled to and uncoupled from the adjustment device.

4. The microscope as recited in claim 2 wherein the holder is coupled to the adjustment device.

5. The microscope as recited in claim 2 wherein the objective element is coupled to the holder using a screwed connection.

6. The microscope as recited in claim 2 wherein the holder is coupled to the adjustment device using a screwed connection.

7. The microscope as recited in claim 2 wherein the objective element is coupled to the holder using a catch.

8. The microscope as recited in claim 7 wherein the catch includes a bayonet connection.

9. The microscope as recited in claim 2 wherein the holder is coupled to the adjustment device using a catch.

10. The microscope as recited in claim 9 wherein the catch includes a bayonet connection.

11. The microscope recited in claim 2 wherein the objective element is coupled to the holder using at least one of a clamping, a latching, and a snap-on connection.

12. The microscope as recited in claim 2 wherein the holder is coupled to the adjustment device using at least one of a clamping, a latching and a snap-on connection.

13. The microscope as recited in claim 1 wherein the specimen stage is configured to be reversibly coupled to and uncoupled from the adjustment device.

14. The microscope as recited in claim 1 wherein the objective element includes a macro-objective, at least one of the holder and the adjustment device being configured to receive the macro-objective.

15. The microscope as recited in claim 1 wherein the adjustment device includes a mechanical drive.

16. The microscope as recited in claim 1 wherein the adjustment device includes an electric drive.

17. A microscope comprising:

a base;

an adjustment device having one of a mechanical drive and an electrical drive configured to position a specimen stage; and an objective element, the objective element being coupled to the adjustment device so that a position of the objective element is adjustable by the adjustment device using the one of a mechanical drive and an electrical drive, wherein the adjustment device is configured to generate a relative movement of the objective element with respect to the base of the microscope.

18. The microscope as recited in claim 17, wherein the adjustment device is configured to generate relative movement of the objective element with respect to a stage of the microscope.

* * * * *